United States Patent
Hom et al.

(10) Patent No.: US 7,038,582 B2
(45) Date of Patent: May 2, 2006

(54) ACCESS CONTROL SYSTEM WIRELESS TRANSMISSION LINK TEST METHOD

(75) Inventors: Wayne C. Hom, Coto de Caza, CA (US); Hagop Sakadjian, Mission Viejo, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 10/865,494

(22) Filed: Jun. 10, 2004

(65) Prior Publication Data

US 2005/0275524 A1 Dec. 15, 2005

(51) Int. Cl.
G08B 29/00 (2006.01)

(52) U.S. Cl. .................... 340/514; 340/506; 340/516

(58) Field of Classification Search ............ 340/572.1, 340/505, 506, 514, 539.1, 539.26, 3.1, 571, 340/531, 539.13, 539.14, 516, 500, 502, 340/504, 515, 524

See application file for complete search history.

(56) References Cited

U.S. PATENT DOCUMENTS

| | | | | |
|---|---|---|---|---|
| 6,040,770 | A * | 3/2000 | Britton | 340/539.24 |
| 6,150,936 | A * | 11/2000 | Addy | 340/539.2 |
| 6,326,889 | B1 * | 12/2001 | Van Horn et al. | 340/572.1 |
| 6,525,657 | B1 * | 2/2003 | Wojcik | 340/514 |
| 2003/0048510 | A1 | 3/2003 | Kawashima et al. | |

FOREIGN PATENT DOCUMENTS

| | | |
|---|---|---|
| DE | 100 35 295 | 4/2002 |
| GB | 2 145 259 | 3/1985 |
| GB | 2 247 137 | 2/1992 |
| GB | 2 259 630 | 3/1993 |
| GB | 2 329 053 | 3/1999 |

OTHER PUBLICATIONS

Search Report for Application No. GB 0511101.8.

* cited by examiner

Primary Examiner—Anh V. La
(74) Attorney, Agent, or Firm—Fitch, Even, Tabin & Flannery (57) ABSTRACT

A wireless host access control unit (11) and one or more corresponding wireless remote user interfaces (14) are configured and arranged to participate in a test mode of operation. Pursuant to the test mode of operation, these two system components participate in one or more test transmissions that exercise a wireless transmission link to thereby assess the viability of that link. A corresponding user-discernable test indicator is then provided at the wireless remote user interface. So configured, an installer can test any number of candidate locations for a wireless remote user interface prior to permanently installing that interface, thereby more likely ensuring that the latter will be able to successfully interface with the wireless host access control unit following installation.

43 Claims, 4 Drawing Sheets

ACCESS CONTROL SYSTEM WIRELESS TRANSMISSION LINK TEST METHOD

FIELD OF THE INVENTION

This invention relates generally to access control methodology and more particularly to wireless remote user interfaces as used therewith.

BACKGROUND OF THE INVENTION

Access control systems of various kinds are known in the art. Some access control systems serve to provide automated (and/or remote) control with respect to a locking mechanism. Other access control systems provide automated (and/or remote) control with respect to a movement of a movable barrier (such as, but not limited to, a single-piece or segmented garage door, a sliding or pivoting gate, a pivoting guard arm, rolling shutters, and the like). These and other access control systems generally serve to provide some point of control with respect to a mechanism that itself governs, in some fashion, access to some further destination (such as, but not limited to, an apartment complex, a parking area, a business area, a recreation or exercise area, and so forth).

Many such access control systems provide one or more user interfaces. A user can then interact in some predetermined manner with such an interface to effect some desired action on the part of the access control system. For example, such a user may assert an "open" or "close" button, insert an identification card having identifying and/or authorizing information stored thereon into a card reader, or bring a so-called radio frequency identification card or tag having similar information within reading range of a corresponding reader, to name but a few. In many instances such a user interface will be directly coupled to a host access control unit via, for example, an electrical or optical conductor.

Such direct coupling serves well under many operating conditions and circumstances. On the other hand, many times such a direct coupling presents difficulties. For example, there may be physical obstacles (such as but not limited to paved driveways, landscaping, buildings, sheer distance, and so forth) or legal obstacles (such as a lack of a proper right-of-way or easement) that render such an approach burdensome or unfeasible. Wireless solutions have been proposed to meet such needs. By this approach, a wireless link serves in lieu of the direct coupling to bear necessary communications and/or signaling as between a remote user interface and a host access control unit.

Such a solution, however, gives rise to new problems. In many cases the wireless link will, of necessity (due to, for example, legal or regulatory requirements) comprise a relatively low power link. That is, only relatively low powered transmissions may be used to establish the wireless link. Also in many cases, the local operating environment may be relatively inhospitable to radio frequency transmissions. For example, local terrain and/or objects may act as radio frequency energy absorbers or reflectors. This, in turn, can result in sufficient signal attenuation and/or other phenomena (such as multipath distortion) as to render the transmissions unintelligible or undetectable and therefore unsuitable for the intended purpose.

These and other problems can result in an ineffective installation and subsequent operation of a remotely located user input device for an access control system. This, in turn, can necessitate additional installation attention and resources and/or follow-up services that can adversely impact the user's system experience while increasing the costs of installation to the user and/or the installer.

BRIEF DESCRIPTION OF THE DRAWINGS

The above needs are at least partially met through provision of the access control system wireless transmission link test method described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION OF THE INVENTION

Generally speaking, pursuant to these various embodiments, upon at least one of a wireless host access control unit and a wireless remote unit being placed in a test mode of operation, at least one wireless transmission link as between the wireless host access control unit and the wireless remote unit is tested. A user-discernable indication of at least one of a successful test of the wireless transmission link and an unsuccessful test of the wireless transmission link is then automatically provided at the wireless remote unit or, if desired, at the wireless host access control unit or both.

Pursuant to one approach, the wireless remote unit transmits at least one predetermined message to the wireless host access control unit via the wireless transmission link. The latter can then support the test process in any of a variety of ways. For example, the wireless host access control unit can repeat the predetermined message as received to the wireless remote unit via the wireless transmission link to enable the wireless remote unit to assess the quality of service as appears to presently characterize the wireless transmission link. As another example, the wireless host access control unit can itself analyze and assess the apparent state of the wireless transmission link (by comparing, for example, the received message against one or more predetermined standards) and provide corresponding information to the wireless remote unit.

So configured, an installer can position the wireless remote unit in one or more candidate trial locations prior to effecting permanent installation and test the wireless transmission link to better ensure that the proposed installation will likely result in satisfactory operation. For example, such an installer can continue to sample candidate locations until a viable location is located via such testing. Such an approach can also be used to facilitate automated or user-initiated testing of the wireless transmission link from time-to-time subsequent to permanent installation to ensure that intervening events (such as the placement of a new building) have not unduly impaired the operability of the remote user interface. Such usage can, in turn, tend to avoid an unsatisfactory installation of a remote user interface and/or can tend to aid in ensuring the continuing operational viability of such a remote user interface.

These and other benefits will become clearer upon making a thorough review and study of the following detailed description.

Figure 1:
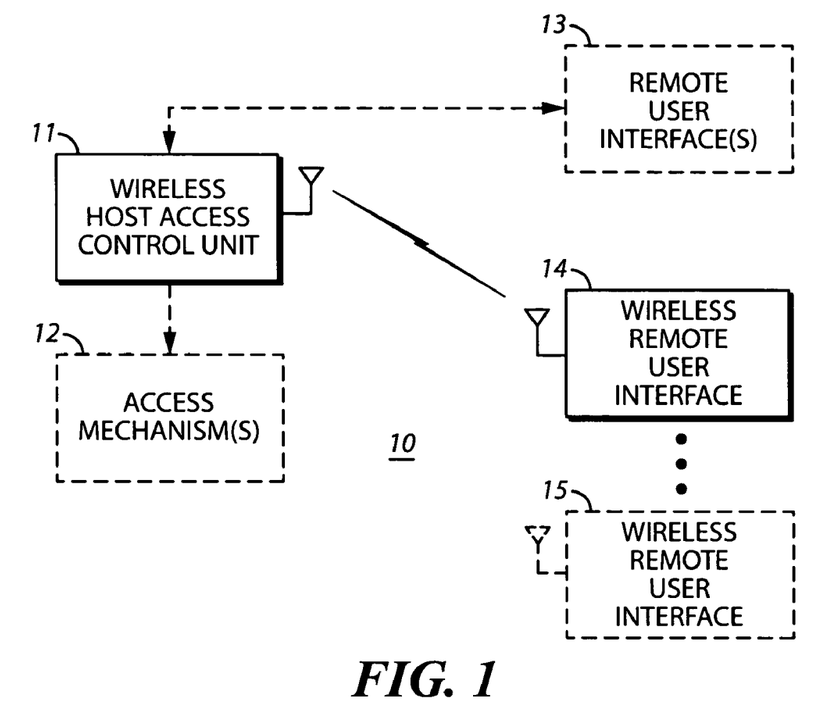
FIG. 1 comprises a block diagram as configured in accordance with various embodiments of the invention.

Referring now to the drawings, and in particular to FIG. 1, these embodiments typically comprise a system 10 that includes at least a wireless host access control unit 11 and a wireless remote user interface 14. The wireless host access control unit 11 can comprise any presently known or hereafter-developed platform of this type and will typically interact in some manner with a corresponding access mechanism 12 or mechanisms (such as but not limited to automated door locks and movable barriers such as, but not limited to, a single-piece or segmented garage door, a sliding or pivoting gate, a pivoting guard arm, rolling shutters, and the like). Such access control units are typically well understood in the art and often comprise, at least in part, a programmable platform that can be readily programmed to accord with the teachings set forth herein. In the alternative, if desired, dedicated-purpose hard-wired solutions can be used as will be well understood by those skilled in the art.

If desired, such a system 10 can further comprise one or more remote user interfaces 13 that couple to the host access control unit 11 via a direct coupling such as, but not limited to, an optical signal link (such as a fiber optic cable) or an electrical conductor or conductors (such as a twisted pair cable as is well known in the art). Such direct coupling can be useful and suitable for settings where the remote user interface 13 is located relatively proximal to the host access control unit 11 and/or where such a direct coupling can be installed and maintained with little or no expected difficulty. Such a system 10 may also include additional wireless remote user interfaces 15 (to accommodate, for example, multiple points of ingress/egress and the like). Such remote user interfaces are generally well known in the art and therefore additional elaboration will not be presented here for the sake of brevity except where pertinent to the following description.

As already noted above, these teachings are applicable to use with such a wireless host access control unit and at least one corresponding wireless remote unit. More particularly, and referring now to FIG. 2, upon placing at least one (and, in a preferred embodiment, both) the wireless host access control unit and the wireless remote unit into a test mode of operation 20, the wireless transmission link (or links) between the wireless host access control unit and the wireless remote unit is tested 21. This process 20 then automatically provides 22, at the wireless remote unit, a user-discernable indication regarding the success, or lack of success, of the test of the wireless transmission link.

Figure 2:
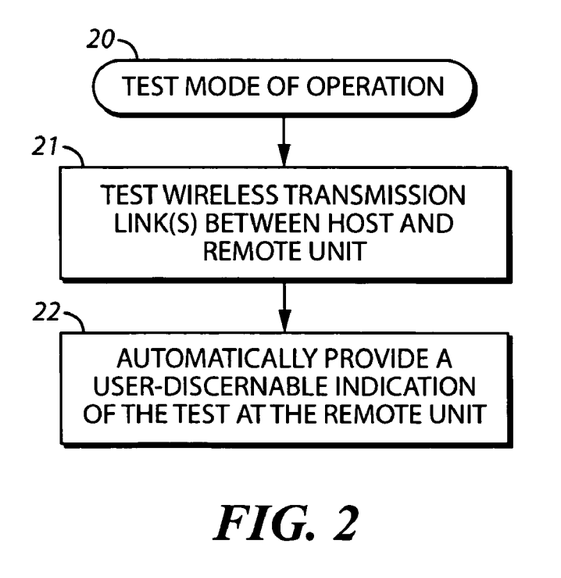
FIG. 2 comprises a flow diagram as configured in accordance with various embodiments of the invention.

These components can be placed into such a test mode of operation in any of a variety of ways. For example, pursuant to one approach, one or both of these system components can be purposefully placed into this test mode of operation when a user manipulates a corresponding "test mode" switch (or other provided user interface) on the component itself. To illustrate, a two-position switch can be provided on the wireless host access control unit and/or the wireless remote user interface with one position corresponding to a normal mode of operation and the remaining position corresponding to this test mode of operation. Pursuant to another approach, at least one of the components can automatically check, continuously or intermittently (such as once a minute, once a second, once every 100 milliseconds, or the like), for test mode indicia and, upon detecting such test mode indicia, itself automatically enter, for at least some predetermined period of time, this test mode of operation. Such test mode indicia could comprise, for example, the presence of a test mode signal or message on the wireless transmission link itself (as transmitted, for example, by the opposite component).

Further description regarding testing of the wireless transmission link will be provided below. The user-discernable indication can comprise one or more of a wide variety of indicators including but not limited to visual user-discernable indications (such as illuminated or blinking lights, presentation of a particular graphic element, icon, or other display, and the like) and/or audible user-discernable indications (such as steady or intermittent tones, alert sounds, pre-recorded or synthesized speech messages, and the like).

In a preferred embodiment, a first specific user-discernable indication serves to indicate an unsuccessful test (and/or a not-yet-successful test) of the wireless transmission link and a second specific user-discernable indication serves to indicate a successful test of the wireless transmission link, wherein the first and second specific user-discernable indications are different from one another. For example, a first audible tone can be used to indicate a successful test and a second, different audible tone can be used to indicate the opposite.

It would also be possible to provide a user-perceivable indication that corresponds to a graded sliding assessment of the test. For example, a row of five discrete light elements (such as light emitting diodes) can serve, when all illuminated, to indicate a highly successful test of the wireless transmission link while three lit elements can serve to indicate a somewhat successful test and one or no lit elements can indicate an unsuccessful test of the wireless transmission link. These measures of success can in turn reflect, for example, a comparison of the relevant test criteria (such as received signal strength, bit error rate, and so forth) to a plurality of performance thresholds as selected to suit the requirements of a given system, setting, manufacturer, or the like.

Figure 3:
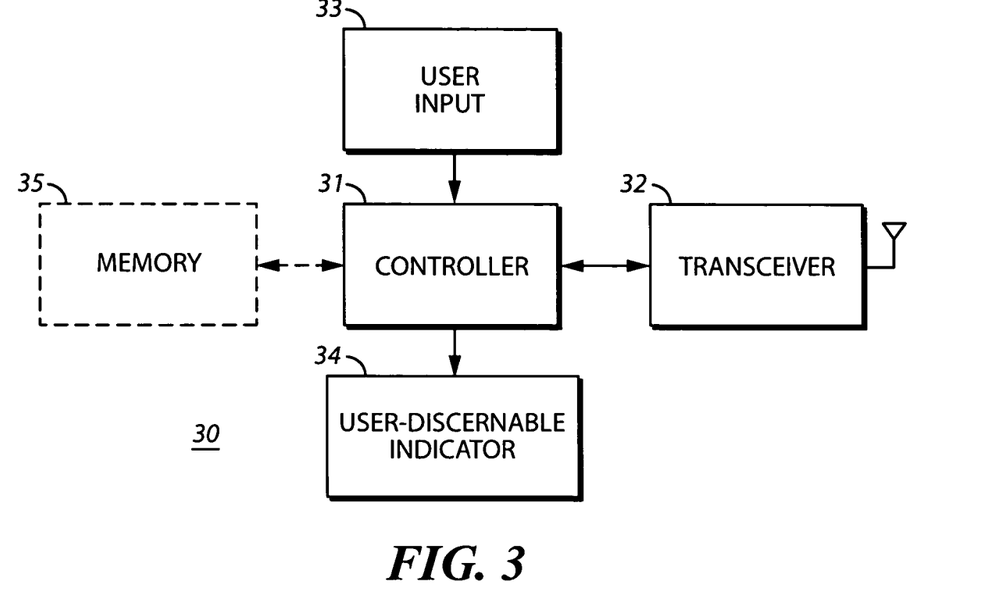
FIG. 3 comprises a block diagram as configured in accordance with various embodiments of the invention.

To facilitate such actions, and referring now to FIG. 3, a wireless remote user interface 30 can comprise a controller 31 that operably couples to a transceiver 32, a user input 33, and a user-discernable indicator 34. The controller 31 can comprise, in a preferred approach, a fully or partially-programmable platform that is programmed in accordance with these teachings. Those skilled in the art, of course, will understand that a dedicated-purpose platform can be substituted for such programmability if desired.

The transceiver 32 serves to transmit and receive system compatible signaling in accord with well understood prior art practice. The transceiver 32 should of course operate compatibly with the chosen technology that defines and characterizes the wireless transmission link. The chosen technology itself can comprise any presently known or hereafter developed methodology including but not limited to radio frequency transmissions (including but not limited to frequency modulation, amplitude modulation, time division multiplexing, frequency division multiplexing, code division multiplexing, and so forth) and optical signal transmissions (including but not limited to infrared).

The user input 33 can comprise any suitable input mechanism and can comprise any or all of assertable surface features (such as toggle switches, push buttons, touch screens, keypads, and so forth), voice recognition engines, and so forth. This user input 33 will typically at least permit a user to enter remote access control commands in accord with a normal mode of operation and ordinary prior art practice and may further permit a user to purposefully place the wireless remote unit 30 into the above-mentioned test mode of operation and/or to cause a present transmission of a test message in accord with teachings set forth below. Other operability can also be supported in this fashion as may correspond to the needs and requirements of a given design and setting.

As noted above, the user-discernable indicator 34 can comprise one or more of a wide variety of indicators. This indicator 34 will preferably at least provide the above-described information to a user regarding the outcome of a test of the wireless transmission link. This indicator 34 may also serve to provide other information to a user as desired, including but not limited to information regarding a present state of operation, diagnostic data, operations feedback, and the like.

If desired and as necessary, optional memory 35 can also be operably coupled to the controller 31 to provide sufficient memory to facilitate the various features and actions described herein. Those skilled in the art will recognize that a given wireless remote unit will also often comprise other components and/or functionality other than that illustrated here. Such details are not presented here for the sake of brevity and clarity, and as these teachings are not particularly dependent upon a selection of any particular configuration in this regard.

These teachings can be employed to permit reliable installation of a given wireless remote user interface with respect to a wireless host access control unit. To illustrate, and referring now to FIG. 4, an installer can be provided with a given wireless remote user interface to install with respect to a given wireless host access control unit 11. For example, the wireless host access control unit 11 may be located within a central command and control facility of a given enterprise and the installer may be tasked with installing the wireless remote user interface proximal to a given point of ingress to the enterprise. The installer can temporarily position the wireless remote user interface at a first wireless remote user interface location 41 (that is, the installer can position the interface at this location 41 without effecting a permanent installation which might otherwise entail the drilling of mounting holes, installation of various mounting members, and so forth) and then place the system components in the test mode of operation.

Figure 4:
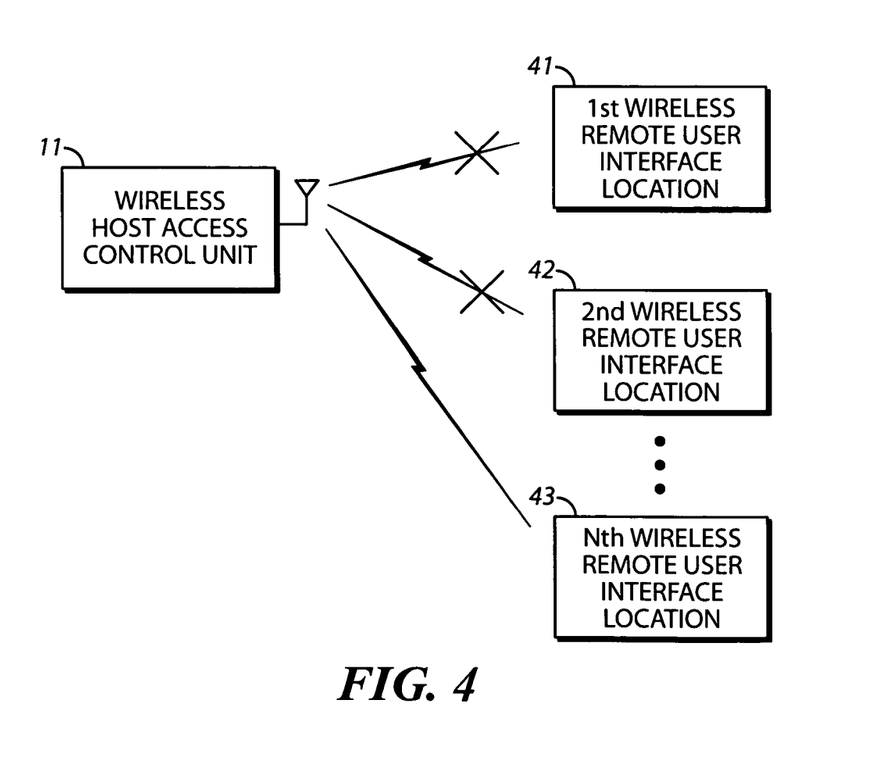
FIG. 4 comprises a block diagram as configured in accordance with various embodiments of the invention.

By using the test mode of operation as described above, in this example the installer will discover that this first location 41 does not correspond to an acceptable wireless transmission link. For example, the wireless transmission link may be completely absent or may exhibit channel conditions that are otherwise unacceptable. The installer can then move the wireless remote user interface to a second location 42 and repeat the process.

Depending upon the configuration selected, the system can either remain in this test mode of operation (either for some predetermined period of time or until the installer causes the system to return to a normal mode of operation or to at least exit the test mode of operation) while the installer considers varying location options or the installer can instigate the test mode of operation with each new candidate location. In either event, the installer can continue to test locations until, for example, an Nth location 43 proves to be characterized by an acceptable wireless transmission link test.

Figure 5:
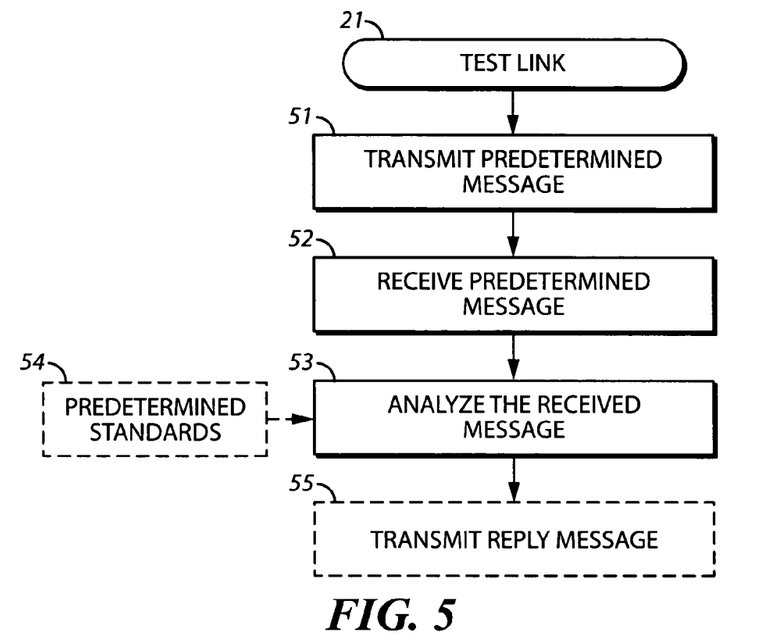
FIG. 5 comprises a flow diagram as configured in accordance with various embodiments of the invention.

Referring now to FIG. 5, additional description regarding such a test 21 of the wireless transmission link will be provided. Upon entering the test mode of operation, one of the above-noted system components can transmit 51 at least one predetermined message to the other component using the wireless transmission link. For example, the wireless host access control unit can transmit such a predetermined message to the wireless remote user interface, or vice versa (or, if desired, both components can transmit such a message to one another). Such a transmission can be automated and can occur once, or several times, pursuant to a timing plan of choice when operating in the test mode of operation. In addition, or in lieu of such an automated approach, the transmitting component can effect such a transmission upon detecting assertion of a user input as is associated with this functionality. For example, the user input as described above for the wireless remote user interface could be used to trigger such a transmission.

The predetermined message itself can comprise any signal (or signals) or message content as may suit the needs of a given application. For example, an audio tone of a specific frequency (and possibly of a given predetermined duration) can comprise a simple predetermined message. As another example, a series of tones of different frequencies and/or durations can comprise the predetermined message. As yet another example, the predetermined message can comprise data having predetermined content such as, to illustrate, alternating binary "1's" and "0's," a stream of binary "1's," or alternating packets of a specific number of binary "1's" and binary "0's," to name a few.

Pursuant to one approach, the system uses only one such predetermined message. Pursuant to another approach the transmitting component can chose from amongst a plurality of candidate predetermined messages. If desired, the predetermined message can further comprise an identifying portion to permit, for example, a system identifier and/or a source or target component identifier to be included therewith. Such an identifier may be useful to aid in distinguishing whether a given test message has been sourced by a component of another system and/or to facilitate in distinguishing amongst a plurality of wireless components as may all comprise a part of a single overall system.

The predetermined message is then received 52 and analyzed 53 to glean, for example, information regarding the nature of the wireless transmission link itself. Pursuant to one approach this analysis can comprise a comparison of the received message against at least one standard 54. Various predetermined standards 54 can serve this purpose, including but not limited to a checksum value, a specific message, and/or a specific data pattern. Such standards can serve to permit an assessment regarding how well, or how poorly, the wireless transmission link serves as an effective communications conduit between these system components. For example, when a received predetermined message compares identically to an expected standard indicative of excellent reception, a conclusion can be drawn that the wireless transmission link is acceptable. When, however, the predetermined message compares poorly to the standard of choice, one may conclude that the link will likely also serve poorly for future communication needs.

If desired, such steps can be repeated a number of times in order to further assess the viability of the wireless transmission link. For example, the test mode of operation may require at least three good transmission/reception events before characterizing the link as being satisfactory.

As described above, the results of a successful test, or of an unsuccessful test, are provided via a user-discernable indication to a user at the remote unit itself. When the remote unit has conducted the analysis described above, the remote unit itself possesses sufficient information to select when and how to present the user-discernable indication. When the wireless host access control unit has conducted the analysis, however, it may be appropriate to have the latter transmit 55 a reply message to the remote user interface.

This reply message can comprise, for example, a message that is substantially identical to the received message. Such an approach presumes that the recipient remote user interface will be arranged and configured to interpret the reception of such a message as being, for example, a positive indicator regarding the nature of the wireless transmission link. By another approach, this reply message can comprise a message that is substantially derived from the received message. By yet another approach, this reply message can comprise information content that substantively reflects the outcome of the analysis step described above (for example, operational codes to indicate successful reception, unsuccessful reception, and so forth).

Figure 6:
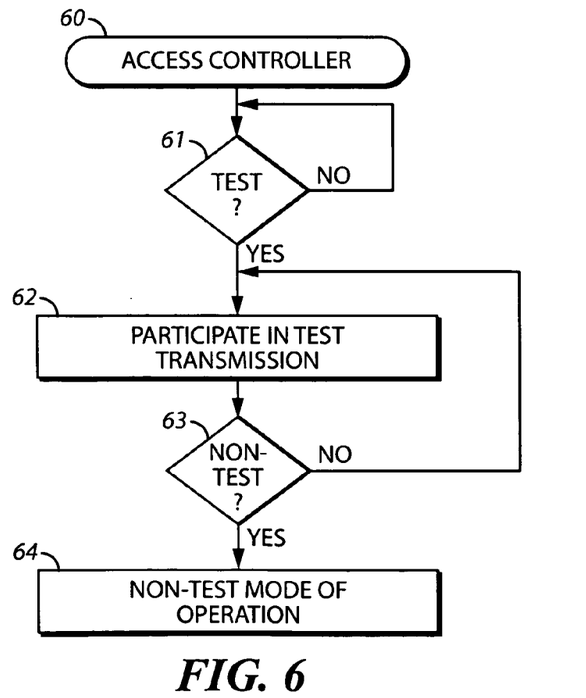
FIG. 6 comprises a flow diagram as configured in accordance with various embodiments of the invention.

Referring now to FIG. 6, the host access control unit can effect a supporting process 60 wherein, upon entering a test mode of operation (which can occur upon, for example, the host access control unit detecting 61 selection of a test mode of operation as described above when a user selects a test mode of operation using a corresponding user interface), the host access control unit will participate 62 in a test transmission of the predetermined test communication via the wireless transmission link.

Pursuant to one approach, this participation 62 can comprise transmission by the host access control unit of the predetermined test communication or a plurality of such test communications as described above. When transmitting a plurality of such test communications, each test communication can be identical to one another or the test communications can be different from one another as may be appropriate to meet the needs of a given application. When different, the test messages can differ with respect to message content, length, modulation, transmission power, error correction techniques, and so forth as desired.

Pursuant to another approach, this participation 62 can comprise receiving the predetermined test communication as transmitted by the wireless remote user interface and analyzing the received test communication, for example, by comparing at least some aspect of the received test communication with one or more predetermined standards. Again, such a predetermined standard can comprise any useful measure of viability, including but not limited to such criteria as the message content itself, a check sum value, a bit error threshold, a missing packet threshold, a successfully-received-packet count threshold, an unsuccessfully-received-packet count threshold, and the like. Pursuant to such an approach to participation 62, the wireless host access control unit can also participate 62 by transmitting to the wireless remote user interface a message that corresponds to this analysis of the received test communication and/or that corresponds to the received test communication itself.

Figure 7:
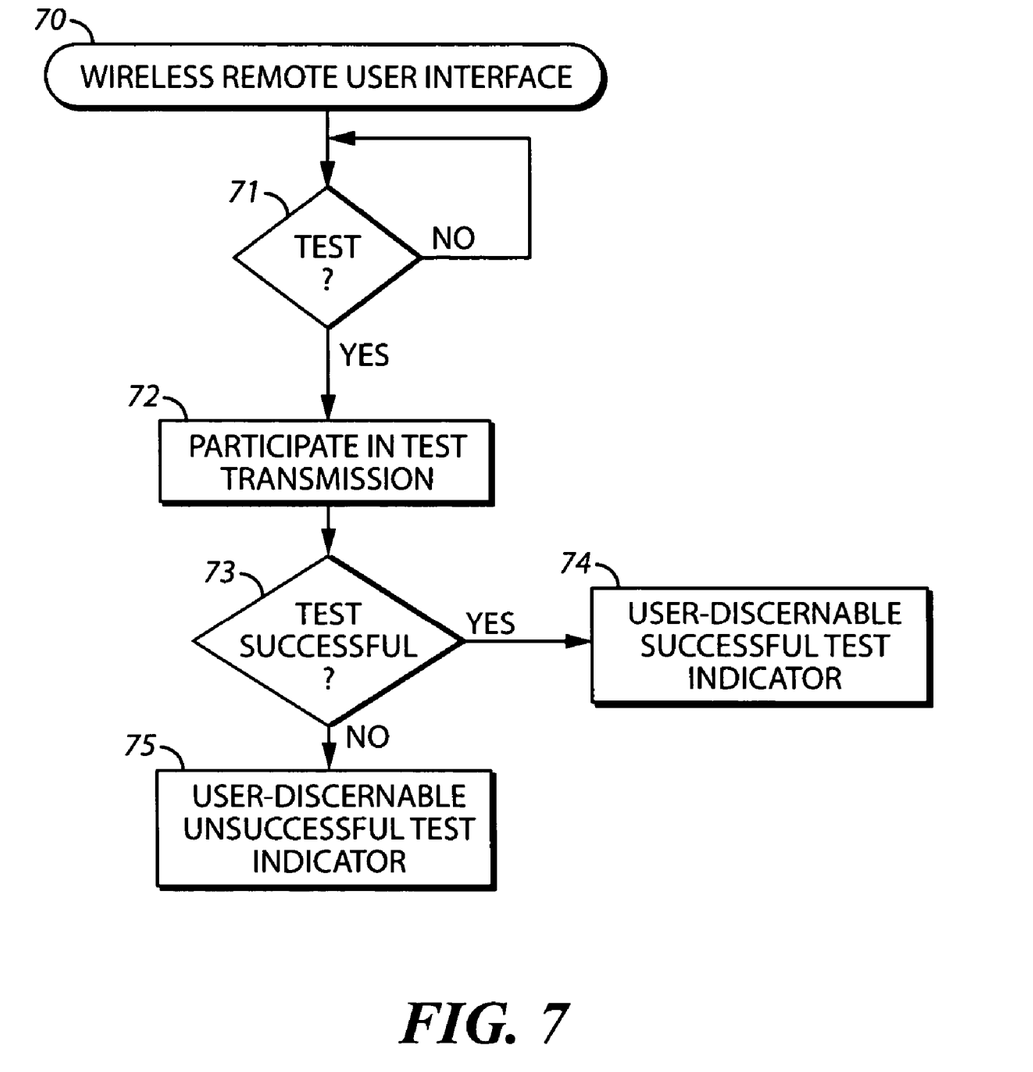
FIG. 7 comprises a flow diagram as configured in accordance with various embodiments of the invention.

Referring now to FIG. 7, an illustrative process 70 to permit a wireless remote user interface to facilitate this testing of a wireless link as between the wireless remote user interface and a wireless access control unit will be described. Upon initiating a test mode of operation (again, for example, by detecting 71 selection of a test mode of operation user interface), the wireless remote user interface itself participates 72 in a test transmission of a predetermined test message using the wireless link.

Pursuant to one approach, this participation 72 comprises transmitting one or more predetermined test messages to the wireless host access control unit. These test transmissions can occur on an automated basis if desired and can comprise a single automated transmission or an automated series of test transmissions of a plurality of predetermined test messages. By one approach, the wireless host access control unit conducts the analysis of the test transmission and responds with a transmission to the wireless remote user interface that comprises a repetition of the predetermined test message itself or of content or with characterizing data that corresponds in some predetermined fashion to the test message as received by the wireless host access control unit.

By another approach, the wireless host access control unit repeats the received message back to the wireless remote user interface. The latter can then conduct the described analysis to assess the viability of the wireless link.

It is possible that a given candidate location for the wireless remote user interface will be utterly unable to establish any detectable link with the wireless host access control unit. Under such circumstances, there will be no received message to compare against a standard or to otherwise assess.

To accommodate such a circumstance, these embodiments further preferably contemplate having the wireless remote user interface participating in the test transmissions by also automatically determining an absence of the test transmission (when reception of the test transmission from the wireless host access control unit is expected), or an absence of a response to its own transmission of the test transmission (when such is the nature of the participation by the wireless remote user interface). More particularly, the wireless remote user interface can detect when such absence has persisted beyond a predetermined threshold (comprised, for example, of a period of time, the duration required to complete an incrementing or decrementing count, or the like).

As a simpler alternative, the onus can be placed upon the user to determine when sufficient time has passed without an indication of a successful test of the wireless link. For example, the wireless remote user interface can serve to only provide a user-discernable indication of a successful test. So configured, it is then up to the user to themselves conclude that when no such indication appears within some relevant period of time, that the wireless link is apparently unsatisfactory.

Pursuant to these teachings, an installer can easily and accurately assess the viability of various candidate locations to permanently install a wireless remote user interface for a wireless host access control system. Such viability, or its absence, can be provided in a user-perceivable fashion. By including such capability in the wireless remote user interface, the installer need not carry additional test gear to assess these conditions. Furthermore, since the ability of a given piece of test equipment to send or to receive successfully with respect to a given wireless host access control unit may differ (sometimes considerably) from the performance of the wireless remote user interface to be installed, using the latter to test the wireless pathway can avoid the errors that can be introduced due to the existence of such differences. Further, such teachings can be implemented at relatively little incremental cost in many instances.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, the wireless host access control unit could transmit a predetermined message to the wireless remote user interface which, upon receiving that message, could then simply repeat that message back to the wireless host access control unit. The latter could then examine that repeated message to discern how closely, or inexactly, the repeated message remained similar to the original predetermined message. As another example, such testing functionality can be implemented (for example, on an automated basis) from time to time subsequent to permanent installation of the wireless remote user interface to continue to check upon and thereby ensure the continued viability of the wireless link. As yet another example, these same teachings could be employed to properly place a given wireless host access control unit with respect to an already permanently installed wireless remote user interface.

We claim:

1. A method for use with a permanently installed wireless host access control unit and a permanently installed wireless remote unit, comprising:
   upon at least one of the wireless host access control unit and the wireless remote unit being placed in a test mode of operation:
   testing at least one wireless transmission link as between the wireless host access control unit and the wireless remote unit;
   automatically providing at the wireless remote unit a user-discernable indication of at least one of a successful test of the at least one wireless transmission link and an unsuccessful test of the at least one wireless transmission link;
   permanently locating at least one of the wireless host access control unit and the wireless remote unit in reliance upon the user-discernable indication.

2. The method of claim 1 wherein testing further comprises transmitting at least one predetermined message from one of the wireless host access control unit and the wireless remote unit to another of the wireless host access control unit and the wireless remote unit.

3. The method of claim 2 wherein testing further comprises receiving the at least one predetermined message at the another of the wireless host access control unit and the wireless remote unit to provide a received message.

4. The method of claim 3 wherein testing further comprises analyzing the received message.

5. The method of claim 4 wherein analyzing the received message further comprises comparing the received message against at least one predetermined standard.

6. The method of claim 5 wherein the at least one predetermined standard further comprises at least one of:
   a checksum value;
   a specific message;
   a specific data pattern.

7. The method of claim 5 wherein analyzing the received message further comprises comparing the receiving message against a plurality of predetermined standards.

8. The method of claim 7 wherein the plurality of predetermined standards further comprises at least one of:
   a checksum value;
   a specific message;
   a specific data pattern.

9. The method of claim 3 wherein testing further comprises transmitting a reply predetermined message to the one of the wireless host access control unit and the wireless remote unit.

10. The method of claim 9 wherein transmitting a reply predetermined message further comprises transmitting a reply predetermined message that is substantially identical to the received message.

11. The method of claim 9 wherein transmitting a reply predetermined message further comprises transmitting a reply predetermined message that is substantially derived from the received message.

12. The method of claim 1 wherein testing further comprises effecting transmission of a predetermined test message upon detecting assertion of a user input as is associated with the wireless remote unit.

13. The method of claim 1 wherein automatically providing at the wireless remote unit a user-discernable indication further comprises providing at least one of:
   an audible user-discernable indication;
   a visual user-discernable indication.

14. The method of claim 1 wherein automatically providing at the wireless remote unit a user-discernable indication further comprises providing a first specific user-discernable indication to indicate an unsuccessful test and a second specific user-discernable indication to indicate a successful test, wherein the first and second specific user-discernable indications are different from each other.

15. A method to facilitate a test of a wireless link between a wireless remote user interface and a wireless access control unit comprising:
   at the wireless remote user interface:
   initiating a test mode of operation;
   participating in a test transmission of a predetermined test message using the wireless link;
   providing a user-discernable successful test indicator when the test transmission is successful;
   providing a user-discernable unsuccessful test indicator when the test transmission is unsuccessful.

16. The method of claim 15 wherein initiating a test mode of operation further comprises detecting selection of a test mode of operation user interface.

17. The method of claim 15 wherein participating in a test transmission of a predetermined test message using the wireless link further comprises transmitting the predetermined test message to the wireless access control unit.

18. The method of claim 17 wherein participating in a test transmission of a predetermined test message using the wireless link further comprises receiving an indication from the wireless access control unit that characterizes reception of the predetermined test message by the wireless access control unit.

19. The method of claim 15 wherein participating in a test transmission of a predetermined test message using the wireless link further comprises receiving the predetermined test message as transmitted by the wireless access control unit.

20. The method of claim 19 wherein participating in a test transmission of a predetermined test message using the wireless link further comprises analyzing the predetermined test message.

21. The method of claim 20 wherein analyzing the predetermined test message further comprises comparing at least one aspect of the predetermined test message against at least one predetermined standard.

22. The method of claim 21 wherein comparing at least one aspect of the predetermined test message against at least one predetermined standard further comprises comparing a plurality of aspects of the predetermined test message against a corresponding plurality of predetermined standards.

23. The method of claim 15 wherein participating in a test transmission of a predetermined test message using the wireless link further comprises participating in an automated series of test transmissions of a plurality of predetermined test messages.

24. The method of claim 23 wherein participating in an automated series of test transmissions of a plurality of predetermined test messages further comprises wherein participating in an automated series of test transmissions of a plurality of predetermined test messages that are substantially identical to one another.

25. The method of claim 15 wherein participating in a test transmission of a predetermined test message using the wireless link further comprises automatically determining an absence of the test transmission of the predetermined test message.

26. The method of claim 25 wherein automatically determining an absence of the test transmission of the predetermined test message further comprises determining that the absence has persisted beyond a predetermined threshold.

27. The method of claim 26 wherein the predetermined threshold comprises at least one of:
a period of time;
an incrementing count;
a decrementing count.

28. A method to facilitate assessing a wireless communication link between a permanently installed access controller and a permanently installed wireless remote user interface comprising:
at the access controller:
detecting selection of a test mode of operation;
in response to detecting selection of the test mode of operation:
participating in a test transmission of a predetermined test communication via the wireless communication link;
permanently locating at least one of the wireless host access controller and the wireless remote interface in reliance upon the user-discernable indication;
detecting selection of a non-test mode of operation;
in response to detecting selection of the non-test mode of operation, operating the access controller in a non-test mode of operation.

29. The method of claim 28 wherein detecting selection of a test mode of operation further comprises detecting a user selection of the test mode of operation.

30. The method of claim 29 wherein detecting a user selection of the test mode of operation further comprises detecting user assertion of a corresponding user interface.

31. The method of claim 28 wherein participating in a test transmission of a predetermined test communication via the wireless communication link further comprises:
transmitting the predetermined test communication to the wireless remote user interface.

32. The method of claim 31 wherein transmitting the predetermined test communication to the wireless remote user interface further comprises transmitting a plurality of predetermined test communications to the wireless remote user interface.

33. The method of claim 32 wherein transmitting a plurality of predetermined test communications to the wireless remote user interface further comprises transmitting a plurality of substantially identical predetermined test communications to the wireless remote user interface.

34. The method of claim 32 wherein transmitting a plurality of predetermined test communications to the wireless remote user interface further comprises transmitting the predetermined test communications to the wireless remote user interface on a substantially periodic basis.

35. The method of claim 31 wherein participating in a test transmission of a predetermined test communication via the wireless communication link further comprises:
receiving a predetermined test communication from the wireless remote user interface.

36. The method of claim 35 wherein receiving a predetermined test communication from the wireless remote user interface further comprises receiving a predetermined test communication from the wireless remote user interface that corresponds to the predetermined test communication as was transmitted to the wireless remote user interface and received thereby.

37. The method of claim 28 wherein participating in a test transmission of a predetermined test communication via the wireless communication link further comprises:
receiving the predetermined test communication from the wireless remote user interface to provide a received test communication.

38. The method of claim 37 wherein participating in a test transmission of a predetermined test communication via the wireless communication link further comprises analyzing the received test communication.

39. The method of claim 38 wherein analyzing the received test communication further comprises comparing at least some aspect of the received test communication with a predetermined standard.

40. The method of claim 39 wherein the predetermined standard comprises at least one of:
message content;
a check sum value;
a bit error threshold;
a missing packet threshold;
a successfully-received-packet count threshold;
an unsuccessfully-received-packet count threshold.

41. The method of claim 38 wherein participating in a test transmission of a predetermined test communication via the wireless communication link further comprises:
transmitting to the wireless remote user interface a message that corresponds to analysis of the received test communication.

42. The method of claim 37 wherein participating in a test transmission of a predetermined test communication via the wireless communication link further comprises:
transmitting to the wireless remote user interface the received test communication.

43. The method of claim 37 wherein participating in a test transmission of a predetermined test communication via the wireless communication link further comprises:
transmitting to the wireless remote user interface a message that corresponds to the received test communication.

* * * * *